United States Patent Office.

CHARLES H. JENKINS, OF BOSTON, MASSACHUSETTS.

Letters Patent No. 101,737, dated April 12, 1870.

IMPROVEMENT IN THE MANUFACTURE OF GLASS.

The Schedule referred to in these Letters Patent and making part of the same.

*To all persons to whom these presents may come:*

Be it known that I, CHARLES H. JENKINS, of Boston, of the county of Suffolk and State of Massachusetts, have invented a new and useful Improvement in the Manufacture of Glass; and do hereby declare the same to be fully described as follows.

The object of my invention is to utilize the waste chips or pieces of statuary marble, or other marble free from protocarbonate or other salts of iron, such as are prejudicial to the fabrication of good white glass.

I am aware that manufactured carbonate of lime has been used in the making of glass, and as one of the constituents of compositions therefor. I have found that for the common calcareous carbonate, as ordinarily used in glass-making, the statuary or white marble may be employed, thus saving the expense of the manufactured carbonate. Therefore, in the manufacture of glass, I employ the following formula or ingredients in or about in the proportions as stated, viz:

Seventy-eight pounds of powdered marble;
Three hundred and thirty-six pounds of sand or silica;
Thirty-eight pounds of nitrate of soda; and
One hundred and fifty-two pounds of bicarbonate of soda.

These ingredients, after having been properly mixed, may be used in a retort and melted together, so as to form a good white glass.

The action of lime in glass-mixtures is to render the alkaline silicates insoluble. It also prevents the melting of the ingredients, and is beneficial in other respects.

By using the marble in a powdered state I am enabled to make glass much cheaper than by the employment of the manufactured carbonate, and besides, as hereinbefore stated, I utilize a substance of which vast quantities are or have heretofore been wasted.

I claim, therefore, as my invention—

The employment of marble, as described, with other materials hereinbefore enumerated, or their equivalent or equivalents, in the formation of a composition for the making of glass.

CHAS. H. JENKINS.

Witnesses:
R. H. EDDY,
J. R. SNOW.